Aug. 13, 1957  E. GOSNEY, JR., ET AL  2,802,312
GRINDING MACHINE
Filed Nov. 13, 1953
3 Sheets-Sheet 1
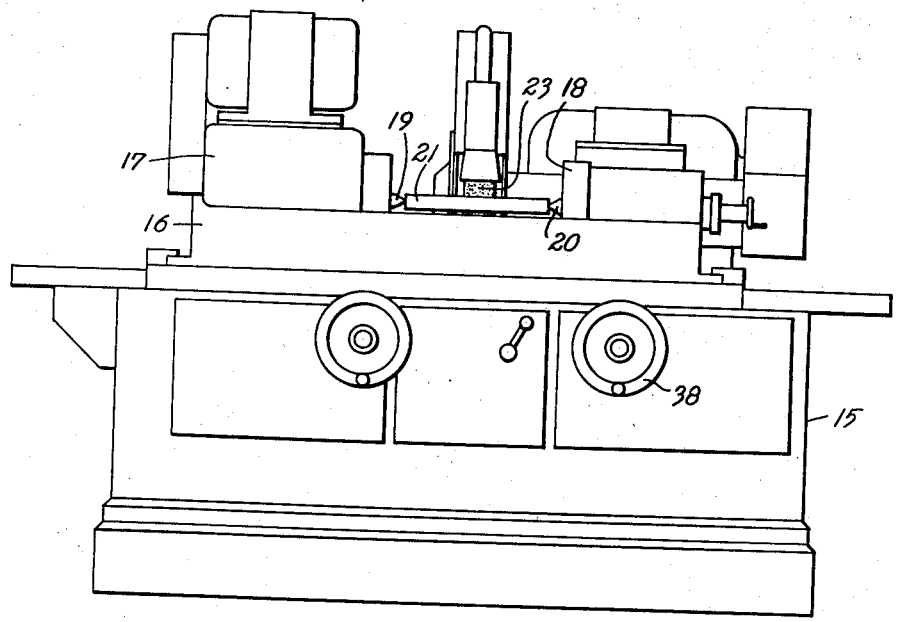
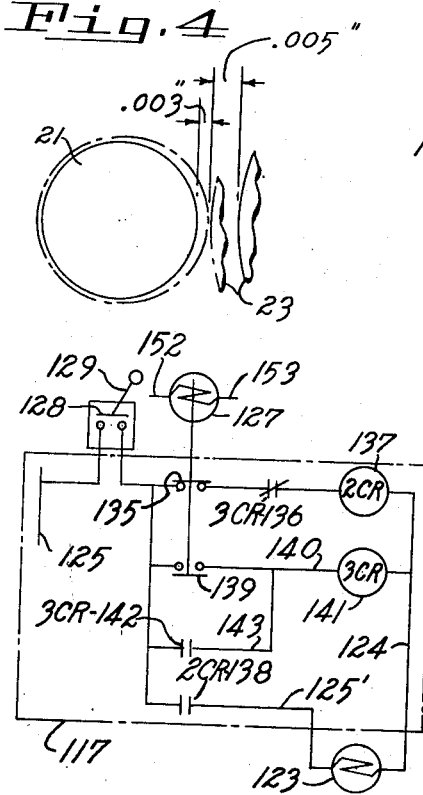
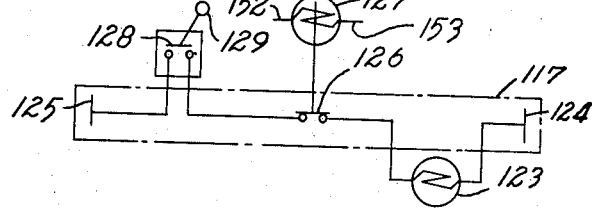
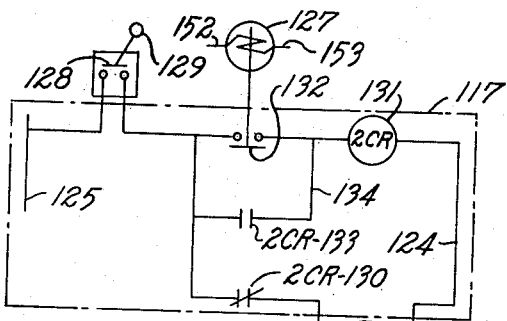
INVENTORS.
ERNEST GOSNEY, JR.
BY GEORGE L. GROVE.
H. K. Parsons & L. W. Wright
ATTORNEYS.

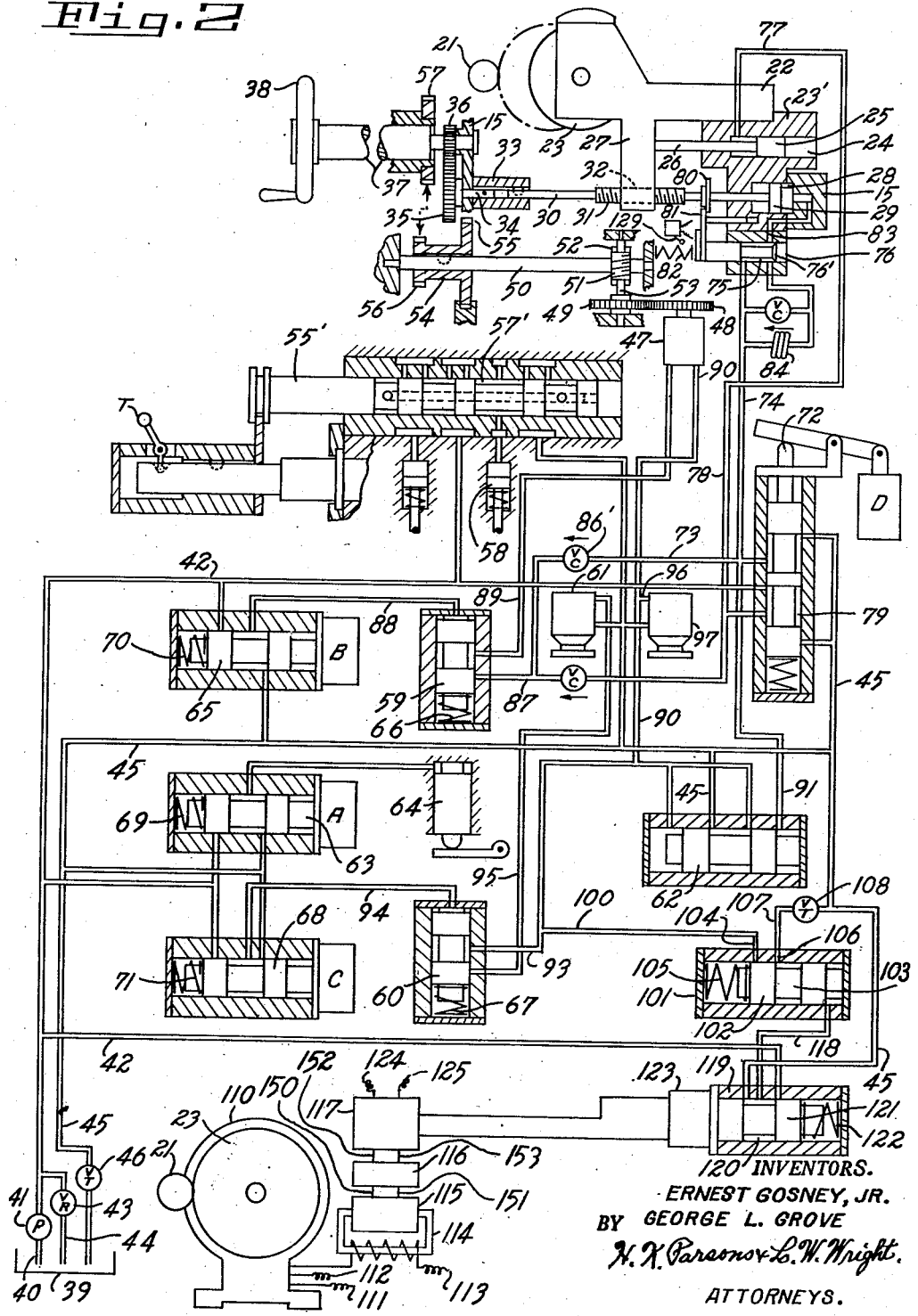

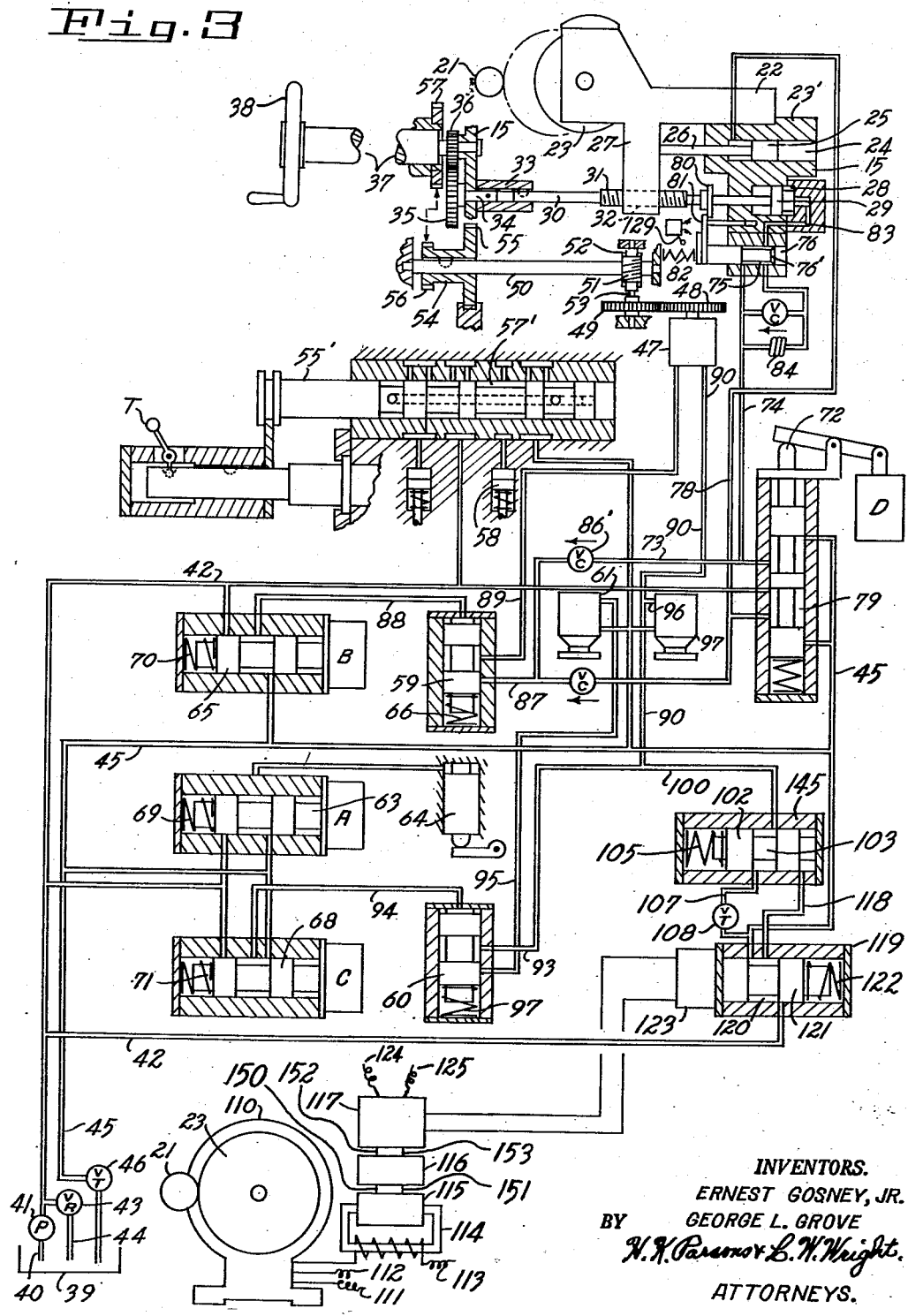

United States Patent Office 2,802,312
Patented Aug. 13, 1957

2,802,312

GRINDING MACHINE

Ernest Gosney, Jr., Mentor, Ky., and George L. Grove, Cincinnati, Ohio, assignors to The Cincinnati Milling Machine Co., Cincinnati, Ohio, a corporation of Ohio Application November 13, 1953, Serial No. 391,962

9 Claims. (Cl. 51—165)

This invention relates to improvements in precision grinding machines and has particular reference to precision machines intended for high production operation in the continuous production of similar parts.

Present production requirements demand that the work pieces turned out on such machines shall be interchangeably utilizable and that they must be accurate within dimensional limits reading to tenths of a thousandth of an inch. At the same time the efficiency and commercial desirability of such machines is determined by the number of pieces per minute and per hour that can be produced within said minute tolerances and with a minimum of spoilage.

It is a recognized fact that in the preliminary forming operations, whether by turning, rough grinding, or otherwise that there are frequently variances in the round or out-of-round condition of the work pieces or their preformed dimensions. Such conditions create an inherent limitation as to mechanical setting of the subsequently employed grinding machine as to the exact point at which the grinding operations on successive work pieces will be initiated. Preexisting conditions have necessitated that any time-saving rapid advance of the grinding wheel toward the work be terminated and a feed rate initiated at a point sufficiently remote from the surface to be ground to allow for any such pre-existing irregularities of the work piece and to prevent shock of engagement between grinding wheel and work piece on account of their relative movement which might cause an undue nicking of the work piece or disturb its position in the work piece centering or holding means. While the present invention may be utilized in connection with various forms of grinding machines and for the performance of varying grinding operations, it is of particular utility in connection with precision grinding machines in which it is intended that the relative feeding movement of work and grinding wheel during finish grinding shall be at a very slow feed rate, for example, in the neighborhood of not more than one-half of a thousandth of an inch per second so that a continuous slight peripheral film may be continuously removed from the work with a minimum of pressure between work and grinding wheel, therefor enhancing the accuracy not only of the dimensional production of the work but also the fineness of the ultimate finish.

It is, therefore, a purpose of the present invention to provide a structure in an accurate or precision grinding machine which will minimize the loss of time in each grinding cycle due to "cutting air" as the grinding wheel is approaching the work but which will at the same time insure proper slowing down of the grinding wheel to the selected feed rate as the wheel moves into engagement with the work, irrespective of dimensional variations, out-of-round conditions or other physical differences or deviations in successive work pieces.

In the drawings, the invention has been illustrated as utilized in connection with a precision grinding machine of the type illustrated and described in United States Letters Patent 2,641,876 in which there is a rapid approach of the grinding wheel toward the work and a subsequent feeding movement initiated at a definite mechanically determined position for regulating the continued movement of the grinding wheel. It has been found, however, in machines of this character, that an attempted mechanical determination of initiation of the feed is not usually practicable at a point less than eight to ten thousandths of an inch from the final machine determined position of the work piece surface to be produced, and that this therefore necessitates an intermediate or air cutting movement of the grinding wheel toward the work at the selected grinding feed rate, for example, of .0004" or four ten thousandths of an inch per second. If the actual contemplated stock removal from a perfectly preformed work piece is designed to be of the nature of three thousandths of an inch for final finishing this means that there will be an air cutting movement for about five thousandths of an inch before the grinding operation actually commences, this being the allowance for over-dimensioned, out-of-round, or other conditions of the work piece and the limitations on mechanical initiation of the feed within fine measurements such as indicated.

It is, therefore, one of the objects of the present invention to provide an improved sensitive and highly accurate feed controlling mechanism which will permit of utilization of a safe selected feed rate during this "air cutting" period and which will be responsive to actual engagement between the grinding wheel and the work at this accelerated feed rate to change the rate to that selected for stock removal purposes.

It will, of course, be understood that the initial feed rate employed is still well within utilizable precision grinding feed rates so that there will be no undue shock upon initial engagement at this rate of the wheel with the work. For example, the machine may be so set as to have a finish feed rate during the "air cutting" period in the nature of .0019" per second as distinguished from the intended-to-be-utilized precision grinding rate of .0004" per second or about a five to one ratio.

With such a variance in feed rates, if the work piece has been accurately preformed, or in other words, has a .003" radial allowance for final stock removal, the first feed rate will be through a distance of approximately .005" at the .0019" rate, or 2.63 seconds with a subsequent .003" feed at .0004" or 7.5 seconds, a total of 10.13 seconds for the grinding cycle. If the entire .008" of movement were at .0004" feed rate the time would be 20 seconds. Thus, the difference in this "air cutting" feed rate and utilization throughout that distance of the selected more rapid grinding feed rate with automatic feed rate reduction will amount to a saving of about ten seconds in the grinding operation of each work piece, greatly increasing the possible hourly production of the machine and decreasing the production costs of the finished work pieces.

Certain characteristic mechanisms for attaining the foregoing results have been illustrated in the accompanying drawings, but it will be understood that modifications may be made in the exact structural details there shown and described, within the scope of the appended claims, without departing from or exceeding the spirit of the invention. Throughout the several views of the drawings similar reference characters are employed to denote the same or similar parts.

Figure 1 is a front elevation of a grinding machine, the type in connection with which the present invention is utilized.

Figure 2 is a diagrammatic view of the wheel head movement control mechanism of said machine.

Figure 3 is a similar view illustrating a different arrangement of hydraulic control circuit.

Figure 4 is a fragmentary view diagrammatically illustrating the relative "wind-cutting" and actual grinding feeding movements of the wheel head.

Figure 5 is a diagram of one form of an electric circuit for controlling the fast feed valve.

Figure 6 is a corresponding diagram of a feed control utilizing a holding circuit, and Fig. 7 illustrates an alternatively employable circuit.

In the drawings the numeral 15 designates the bed of a grinding machine having translatably mounted thereon for longitudinal traverse the table unit 16 bearing the suitably driven headstock 17 and the tailstock 18, providing the centers 19 and 20 respectively for determination of the axis of rotation of the work piece 21.

Additionally, slidably supported by the bed 15 is a wheel head slide 22 bearing the grinding wheel 23. This slide is movable toward and away from the work piece position determined by the headstock and tailstock centers 19 and 20.

Suitably mounted on or formed as a part of the bed 15 is the cylinder block 23' having a first cylinder or chamber 24 in which is movable piston 25 coupled by rod 26 with depending portion 27 of the wheel head slide 22. The block 23' is further provided with an additional cylinder or chamber 28 containing piston 29 having the piston rod 30 extending forwardly therefrom and formed with the screw thread portion 31 engaged in nut portion 32 of member 27. The forward end of rod 30 is splined for relative axial sliding movement with respect to sleeve 33 carried by the stud shaft 34 suitably journaled in the bed 15 and bearing the drive gear 35. It will thus be evident that reciprocation of pistons 25 and 29 will effect a forward and rearward or advancing and retracting movement of the wheel head slide 22 while rotation of gear 35 and thus of screw 31 will vary the effective position of the wheel head for a given amount of movement of the piston 29.

The drive gear 35 is in mesh with pinion 36 on shaft 37 which is manually actuable as by the pilot wheel assembly 38.

By reference to the drawings it will be evident that the cyclic relative movements of work support and grinding wheel support, in the present instance indicated as a movement of the grinding wheel head or slide, are hydraulically effected, the basic hydraulic circuit being particularly illustrated in Figure 2.

The hydraulic system includes a hydraulic reservoir 39 into which extends the intake 40 of pump 41 discharging into the pressure supply line 42. The pressure in the line and volumetric supply is controlled by relief valve 43 having return conduit 44 returning the excess discharge of pump 41 to reservoir 39, while a low pressure or return conduit system 45 conducts the hydraulic medium back to the reservoir by way of the low pressure valve 46.

In Figure 2 the hydraulic circuit control mechanisms have been indicated in the stop position. For effecting forward and reverse feeding, as distinguished from the rapid advance or retraction effectable through the piston mehcanisms 25 and 29, there has been provided a hydraulic motor 47 perferably of the rotary type having a drive gear 48 in constant mesh with gear 49 on worm shaft 53 carrying worm 51, driving the worm gear 52 on shaft 50. Splined and slidable on the shaft 50 is the reversing gear couplet 54 having a first gear 55 movable into direct intermeshing engagement with gear 35 on shaft 34 for effecting rotation of screw 31 in a direction to feed the wheel head 22 forward to cause engagement of the grinding wheel 23 with the work piece 21.

The couplet has a second gear 56 alternatively engageable to drive gear 57 as indicated by the arrow in Figure 2 for retraction of the wheel head 22. The gears 55 and 56 are sufficiently spaced to be shiftable into an intermediate or non-engaging position as indicated in Figure 2.

Initiation of a grinding cycle for either infeed or transverse purposes is controlled by the handle T connected with the start-stop valve 55', the pressure conduit 42 being centrally connected to this valve. Movement of the valve toward the left serves to couple pressure conduit 42 by way of cannelure 57' with pressure switch 58 to energize the electric control circuit of the machine as shown in Patent 2,641,876.

By reference to Figure 2, it will be noted, as described in said patent, that there have been provided a number of control valves in the hydraulic circuit including power cut-off valve 59 for cutting off supply of actuating medium to the motor 47, the rate selector valve 60 for preventing return flow from the motor to the fast grinding rate throttle valve 61 and thus to reservoir, and the rate control circuit bypass valve 62. Additionally, there is provided the solenoid operated valve 63 for control of the stop plunger 64, the solenoid operated valve 65 for control of the power cut-off valve 59 and the solenoid operated valve 68 for control of the rate valve 60. In Figure 2 the several valves have been shown with the machine stopped in retracted position. It will be noted that the valves 59 and 60 are held in shut-off position by the respective springs 66 and 67 and that the various solenoid operated valves 63, 65, and 68 are shown in their right hand positions as effected respectively by the springs 69, 70, and 71. As a result, the associated hydraulically controlled piston elements are coupled with the reservoir line 45. This prevents hydraulic operation of the various parts of the machine and insures automatic reversal or retraction of the wheel head under static conditions or in the event of failure or interruption of the electrical control circuit.

Alternatively, when the electrical control circuit is energized by movement of the control handle T in a counterclockwise direction, the several solenoids A, B, C, and D are energized, and the machine cycle is initiated. Movement of the valve 72 by solenoid D couples pressure conduit 42 through lines 73 and 74 and cannelure 75 of valve 76 with the rear of chamber 28 to react against piston 29 moving the same to the left as viewed in Figure 2. At the same time, conduit 77 from the left hand end of cylinder 24 is coupled by way of line 78 and cannelure 79 to the return conduit 45. As piston 29 moves toward the left, dog 80 on rod 30 engages the collar 81 on valve 76 moving this valve to the left against the opening force of spring 82. Valve 76 has the taper or throttle portion 76' which tends to shut off the flow through port 83, reducing the supply of actuating medium to cylinder 28 so that as the port is closed, this medium is supplied only by way of choke coil 84 and cannelure 75, automatically reducing the rate of rapid traverse or initial infeed of the slide 22 which will then continue until the piston 29 is seated against the bed unit 15. The continuing pressure through coil 84 securely holds piston 29 forward against the fixed limit stop provided by the cylinder head locking the parts in position during the grinding operation. Pressure will then build up in line 74 to open check valve 86'.

The actuating medium will then flow through check valve 86' and line 87 to valve 59. Actuation of solenoid B will have moved valve 65 to the left, coupling line 42 with line 88 moving valve 59 downward and opening the valve 59 to connect pressure conduit 87 to line 89 extending to the intake side of motor 47, the exhaust or return flow from the motor being discharged through line 90. Pressure in line 91 having moved return by-pass valve 62 to the left, the direct or unobstructed flow from motor exhaust line 90 to return line 45 is interrupted and this flow can take place only through lines 96, 93 and 100. As solenoid C has been energized, valve 68 is then in its left hand position and pressure from line 42 through line 94 has moved valve 60 downward. The return pressure flow therefore divides, part going by way of line 95 through the fast grinding feed rate valve 61 to low pressure or exhaust conduit 45, and part going by way of line 96 and the fine grinding feed rate valve 97. It will thus be seen that the motor 47 is permitted to operate at a grinding feed rate as determined by the joint setting of the throttles 61 and 97.

With the pinion 56 shifted to the right, the rotation of motor will act through gear 57, pinion 36 and gear 35 to rotate the screw 31 in a direction to effect an advancing movement of the carriage 22 with respect to the piston rod 30. As pointed out, the rate of this feed advance is controlled by the rate of exhaust flow through conduit 90, the normal setting of the valves 61 and 97 in the example given being four ten thousandths of an inch per second.

In Figure 2, the motor return conduit 90 has been shown with a branch conduit 100 extending to the valve housing 101 containing the sliding valve 102 having cannelure 103 normally held out of alignment with the port 104 of conduit 100 by spring 105. This cannelure communicates through port 106 with conduit 107 which is coupled with the general reservoir return conduit system 45.

Interposed in the conduit 107 is the variable throttle valve 108 for determining the "wind-cutting" or additional fast feed rate of the motor and which may be used, for example, to establish .0019" feed rate per second. When this valve 102 is moved to the left, conduit 100 will be hydraulically connected with conduit 107 permitting the faster operation of the feed motor. It is contemplated in the present invention that the positioning of this valve 102 and therefore the availability and effectiveness of the rate determined by the setting of the throttle valve 108 shall be controlled by the fluctuations in power required for operation of the grinding wheel drive motor 110. As shown, power is supplied for operation of this motor through the leads 111, 112, and 113. Loop 114 of transformer 115 is inductively associated with one of these power leads, such as 113, and the resultant induced current is coupled by leads 150 and 151 by way of the electronic amplifier 116 and leads 152 and 153 to the relay box 117. In practice this box houses the transformer current operable control switch 127 and such additional relays as are illustrated in Figures 6 and 7.

As illustrated in Figure 2, the movement of valve 102 to the left, rendering the throttle 108 effective is preferably hydraulically controlled by introduction of pressure against the right hand end of the valve through conduit 118 which extends from valve body 119 to valve body 101, communicating with cannelure 120 in valve 121 in either the left hand position of the valve, as shown, or in its right hand position. Spring 122 normally retains the valve in a left hand position as shown from which it may be shifted toward the right upon energization of the associated solenoid 123. In its left hand position, conduit 118 is connected by way of the cannelure to the reservoir return conduit system 45. However, when solenoid 123 is energized and valve 121 moved to the right, the valve will cut off communication with reservoir conduit 45, coupling 118 with pressure conduit 42, the pressure then reacting to move valve 102 to the left. Solenoid 123 is energizable by control circuit including the wires or power lines 124 and 125. In the electric diagrams of Figures 5, 6 and 7 there is shown a switch 126 controlled by a switch relay 127. In Figure 5, this switch 126 has been shown in a normally closed or circuit completing position. The operating circuit connected between power lines 124, 125 further includes a limit switch 128 operable by a plunger or arm 129 extending into the path of movement of collar 81 on valve 76. As this collar moves forward near the termination of the rapid advance of the wheel head it serves to shift arm 129, causing switch 128 to close thereby energizing solenoid 123. This switch is then maintained closed during the entire feeding movement of the machine but is released to interrupt and deenergize the control circuit for the fast feed approach during the rapid retraction of the wheel head.

A basic or simplified control circuit embodying the principles of the present invention has been illustrated in Figure 5. In the retracted position of the wheel head, switch 128 is open but switch 126 is closed. As the wheel head advances, switch 128 is closed and the solenoid 123 energized. However, as the load builds up in the lead 113 to motor 110, this reacts through the transformer 115 to energize control relay 127 to open switch 126 and deenergize the solenoid. This, then reacts through the hydraulic connection shown to release valve 102 which is moved by spring 105 in the position shown in Figure 2, blocking or preventing flow through throttle 108 and therefore placing the rate of wheel head movement completely under control of the slow grinding feed rate throttle valves 61 and 97. It will be noted that in this form of the invention any drop in the load will deenergize the control relay 127. This manner of operation is found useful in some instances in that as the grinding wheel tends to cut itself free, closing of the switch 126 will give a momentary rapid impulse or, as it were, an intermittent feed rate which can be used either for speeding up of the grinding operation or in connection with pick feed mechanism or the like to obtain successive incremental adjustments.

In the event that it is desired to have a more complete control of the grinding operations and prevent recurrence or reengagement of the fast approach feed, once the same has been interrupted, use may be made, for example, of the control circuit diagrammatically shown in Figure 6. This form is still under control of the wheel head actuated switch 128, and the solenoid operating circuit is completed through normally closed switch 2CR—130 corresponding in effect to switch 126 of Figure 5. In this instance, however, the control relay 2CR—131 serves, when energized, to open switch 130. Energization of control relay 131 is controlled by switch 132 operated by the transformer energizable controlled relay 127. When relay 127 is sufficiently energized by increase on load of the wheel head motor 110 switch 132 is closed and control relay 131 energized. This opens switch 130 to the solenoid 123, and at the same time closes switch 2CR—133 of the shunt or holding circuit 134. As a result, when this form of circuit is utilized, deenergization or release of control relay 127 will permit an opening of switch 132 but there will still be a current flow from line 125 to line 124 through switch 133, maintaining control relay 131 energized and holding normally closed switch 130 open until such time as the entire circuit is deenergized by release of plunger 129 and consequent opening of switch 128.

A further embodiment of the invention is illustrated in Figure 7 in which the basic flow of current from line 125 to line 124 through solenoid 123 is again controlled by the switch 128. When the switch 128 is closed, the current flows through normally closed serially connected switches 135 and 3CR—136 to control relay 2CR—137 which operates to close switch 2CR—138, energizing solenoid 123 through line 125'. Valve 102, as shown in Figure 2, is moved to the left, permitting exhaust flow through throttle 108. In this embodiment, there is a second normally opened switch 139 in a branch control circuit 140 extending to and for energization of the control relay 3CR—141. When load control transformer circuit effects energization of the control relay 127, switch 135 is opened, deenergizing control relay 137 to release switch 138. At the same time normally open switch 139, also controlled by relay 127, is closed, completing an energizing circuit to control relay 3CR—141 which is temporarily energized to open switch 3CR—136 in the circuit to control relay 2CR—137 and at the same time close switch 3CR—142 in the holding circuit 143 for relay 3CR—141. By this circuit switch 138 then remains in open position so that there can be no further flow of current to solenoid 123 irrespective of whether relay 127 is subsequently energized or deenergized.

It will be noted in the several forms described that the control circuit is preferably dependent for its energization on the movement of the wheel head so that all intermediate elements are automatically deenergized on the retracting stroke, and the fast feed rate becomes potentially effective only at a selected point in the machine cycle.

As has been pointed out, the form of invention illustrated in Figure 2 includes the by-pass valve 62 automatically rendered effective on operation of the reversing mechanism to provide a substantially free reservoir return flow permitting speeding up of the motor 47 during reversal. A slightly modified form of the invention has been illustrated in connection with Figure 3 in which the controls correspond to those previously described but in which the by-pass valve is eliminated and the arrangement and connection of parts is such that the fast feed throttle will be operative during such reverse movement. In attainment of this result the conduit 100 is ported into the valve housing 145 which corresponds to the valve housing 101 at a point opposite the cannelure 103 of valve 102 when this valve is in its normal or right hand position providing direct flow connection to the conduit 107 containing the adjustable throttle 108. The control for the valve 102, as before, is by reaction of solenoid 123 with respect to valve 121 so that when the solenoid is energized, valve 121 will be moved to the right, introducing pressure to react against the right hand end of valve 102. In this embodiment, however, movement of valve 102 in place of coupling line 100 to line 107 will effect a disconnection or blocking of the throttle flow. The control for solenoid 123 may be the switch 126 normally in its open or control circuit interrupting position instead of in its closed position as indicated in Figure 5 and under control of the transformer circuit activatable control relay 127. During infeeding movement load increase on the grinding wheel, as previously described, will cause an energization of the transformer circuit and, in this instance, cause the control relay to shift the switch 126 into a closed position. This will cause energization of the solenoid to move and hold the valve 121 to the right coupling the hydraulic power line 42 with valve 102 to move the valve to its left hand or blocmking position. As long as the exciting current is effective in the transformer circuit, valve 102 will remain in its blocking position. However, on reversal of the machine, when the grinding wheel runs free, switch 126 will be released, permitting valve 102 to move to the right into unblocking position. It will, of course, be understood that desired conventional relay interlocks or the like may be employed to supplement the basic circuit elements just described in determining the energization and deenergization of solenoid 123.

From the foregoing it will be seen that there has been provided a novel and improved grinding machine control mechanism having available a plurality of machining or grinding rates, together with a selector for determination of the availability of a controllable feed rate approach. It will further be noted that there has been provided wheel head movement synchronized means for primary determination of the activation of the selector mechanism, in connection with additional wheel load activated controls for determining the availability of the approach feed rate or the change of rates, either deceleratively, acceleratively or alternatively in accordance with fluctuations of the work load on the grinding wheel.

What is claimed is:

1. A precision grinding machine comprising a bed, a work support carried by the bed, a grinding wheel, a slide supporting the grinding wheel on the bed for feeding movement in a direction toward the work support, an electric motor for rotating the grinding wheel, power lines coupled to the motor for energizing the motor, hydraulic feeding mechanism or controlling movement of the slide including a hydraulic motor, a hydraulic motor circuit, a plurality of throttles for determining the rate of flow of hydraulic medium through the conduit, a valve movable to connect one of the throttles with the conduit, a solenoid coupled with the valve to control the movement of the valve, a solenoid energizing power circuit for controlling the energization of the solenoid, and control means for the solenoid power circuit including a control circuit containing a transformer inductively coupled with one of the motor power lines and responsive to fluctuation in load variations in said motor power line to vary the energization of the solenoid.

2. A precision grinding machine comprising a bed, a work support carried by the bed, a grinding wheel, a slide supporting the grinding wheel on the bed for feeding movement in a direction toward the work support, an electric motor for rotating the grinding wheel, power lines coupled to the motor for energizing the motor, a feeding mechanism for controlling the feeding movement of the slide, including a hydraulic motor, input and discharge conduits connected to said hydraulic motor, and throttling means controlling flow through the conduits, said throttling means comprising a fast feed rate throttle, and a machining feed rate throttle, a transformer having its input variably excited by changes in the electric motor load conditions as reflected in one of the power lines, and means electrically responsive to current change in the transformer output coupled to disconnect the fast feed rate throttle as respects the hydraulic motor conduits as the electric motor load increases.

3. A precision grinding machine comprising a bed, a work support carried by the bed, a grinding wheel, a slide supporting the grinding wheel on the bed for feeding movement in a direction toward the work support, an electric motor for rotating the grinding wheel, power lines coupled to the motor for energizing the motor, a rapid traverse mechanism and a feeding mechanism for controlling the movement of the slide, a fast feed rate control and a slower feed rate control for said feeding mechanism, a solenoid for determining the effective coupling of one of said rate controls with the feeding mechanism, a solenoid power circuit coupled with the solenoid for controlling the energization of the solenoid, a switch serially interposed in said power circuit, means actutable during rapid traverse movement of the slide for operating said switch, an additional solenoid control switch serially interposed in said power circuit, and a circuit for controlling operation of said additional switch, said control circuit including a transformer inductively coupled with one of the motor power lines and responsive to fluctuation in load variations in said motor power line to vary the energization of the control circuit.

4. A precision grinding machine comprising a bed, a work support carried by the bed for holding a workpiece, a grinding wheel, a slide supporting the grinding wheel on the bed for feeding movement relative to the work support, an electric motor for rotating the grinding wheel, power lines connected to the motor for energizing the same, a first translation mechanism for moving said slide in rapid traverse toward and away from said work support, a second translation mechanism for providing feeding movement of said slide toward and away from said work support, said second translation mechanism including a hydraulic motor, a conduit connected to said hydraulic motor, and means for controlling the flow of fluid through said hydraulic motor including a fast feed rate throttle valve, and a slow feed rate throttle valve communicatively connected to said conduit, a valve operable to connect said fast feed rate throttle valve to said conduit or to disconnect it therefrom, a solenoid for controlling the operation of said valve, an energizing circuit for said solenoid, means actuated during rapid traverse movement of said slide toward said work support by said first translation mechanism for energizing said solenoid to cause said fast feed rate throttle valve to be connected to said conduit, and a transformer having its primary winding inductively coupled to one of said power lines, and its secondary winding operatively associated with said solenoid energizing circuit to cause said fast feed rate throttle valve to be disconnected from said conduit when said grinding wheel contacts the workpiece.

5. The grinding machine of claim 4 including means for maintaining said fast feed rate throttle valve disconnected from said conduit until said slide is moved away from said work support in rapid traverse by said first translation mechanism.

6. The grinding machine of claim 4 wherein said means actuated during rapid traverse of said slide toward the work support includes a pair of normally open switch contacts connected in series with said solenoid across said energizing circuit.

7. The grinding machine of claim 6 including a relay adapted to be energized by the increased current flow in the secondary winding of said transformer when the workpiece is contacted by said grinding wheel.

8. The grinding machine of claim 7 including normally closed contacts on said relay connected in series with said solenoid in said energizing circuit.

9. The grinding machine of claim 7 including a pair of normally open contacts on said relay, a second relay, said normally open contacts and said second relay being connected in series with said switch contacts across said energizing circuit, and contacts controlled by said second relay for deenergizing said solenoid when the first-mentioned relay is energized and for providing a holding circuit for said second relay.

References Cited in the file of this patent

UNITED STATES PATENTS

| | | |
|---|---|---|
| 1,996,465 | Ernst | Apr. 2, 1935 |
| 1,996,467 | Ernst | Apr. 2, 1935 |
| 2,129,049 | Doran | Sept. 6, 1938 |
| 2,168,596 | Hall | Aug. 8, 1939 |
| 2,448,921 | Silven | Sept. 7, 1948 |
| 2,467,768 | Montgomery et al. | Apr. 19, 1949 |
| 2,544,156 | Hathaway | Mar. 6, 1951 |
| 2,641,876 | Decker et al. | June 16, 1953 |

FOREIGN PATENTS

| | | |
|---|---|---|
| 363,544 | Great Britain | Dec. 24, 1931 |